(12) United States Patent
Wright et al.

(10) Patent No.: US 7,774,546 B1
(45) Date of Patent: Aug. 10, 2010

(54) METHOD AND APPARATUS FOR FACILITATING IN-CACHE REFERENCE COUNTING

(75) Inventors: Gregory M. Wright, Mountain View, CA (US); Matthew L. Seidl, Austin, TX (US); Mario I. Wolczko, San Carlos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 249 days.

(21) Appl. No.: 11/155,276

(22) Filed: Jun. 17, 2005

(51) Int. Cl.
*G06F 12/00* (2006.01)
*G06F 13/00* (2006.01)
*G06F 13/28* (2006.01)

(52) U.S. Cl. .................. 711/118; 711/170; 711/159; 707/206

(58) Field of Classification Search .............. 711/170, 711/118, 159; 707/206
See application file for complete search history.

(56) References Cited

U.S. PATENT DOCUMENTS

| | | | |
|---|---|---|---|
| 7,299,242 B2 * | 11/2007 | Moir et al. ............... | 707/103 Z |
| 2003/0009630 A1 * | 1/2003 | Morris et al. ............. | 711/133 |
| 2004/0193856 A1 * | 9/2004 | Wang et al. .............. | 712/238 |
| 2006/0031228 A1 * | 2/2006 | Bosworth et al. ......... | 707/10 |
| 2006/0218561 A1 * | 9/2006 | Moir et al. ............... | 719/316 |

OTHER PUBLICATIONS

Microsoft Computer Dictionary, 1999, Microsoft Press, Fourth Edition, p. 487.*
Publication entitled "Object Caching for Performance in Object-Oriented Systems", by J. Morris Chang et al., Proc. Intl. Conf.on Computer Design, IEEE, Oct. 1991, pp. 379-385.
Publication entitled "Cache Memory Design Considerations to Support Languages With Dynamic Heap Allocation", by Chih-Jui Peng et al., Tech Report 860, Computer Science Dept., U. Wisconsin-Madison, Jul. 1989.

* cited by examiner

*Primary Examiner*—Sanjiv Shah
*Assistant Examiner*—Midys Rojas
(74) *Attorney, Agent, or Firm*—Park, Vaughan & Fleming LLP

(57) ABSTRACT

One embodiment of the present invention provides a system that facilitates in-cache reference counting in a cache memory. During operation, the system receives a command to update an old cache line with a new cache line. The system then determines if the new cache line is different than the old cache line. If so, the system determines if the old cache line contains any in-cache references. If so, for each such in-cache reference, the system decrements a reference counter in a cache line containing an object which is referenced by the in-cache reference. The system also determines if the new cache line contains any in-cache references. If so, for each such in-cache reference, the system increments a reference counter in a cache line containing an object which is referenced by the in-cache reference. Note that the reference counter in a cache line indicates a count of references in the cache that refer to an object contained in the cache line.

20 Claims, 5 Drawing Sheets

METHOD AND APPARATUS FOR FACILITATING IN-CACHE REFERENCE COUNTING

BACKGROUND

1. Field of the Invention

The present invention relates to computer systems. More specifically, the present invention relates to a method and an apparatus for in-cache reference counting to facilitate garbage-collection in computer systems.

2. Related Art

Computer users are increasingly demanding the ability to scale computer applications so that they can use very large heaps while maintaining performance. In particular, users are increasingly requiring low garbage-collection overhead and low pause times for systems that access heaps. In many instances, object caches and garbage-collection mechanisms may improve things significantly. Existing in-cache garbage-collection mechanisms are typically based on mark-sweep techniques, and typically perform several passes with recursion over the contents of the caches. The performance of this type of scheme is very dependent on the structure of the object graph. Consequently, even though throughput may be improved, there may still be significant pauses for particular processors during such garbage-collection operations.

Hence, what is needed is a method and an apparatus for performing in-cache garbage-collection without the problems described above.

SUMMARY

One embodiment of the present invention provides a system that facilitates in-cache reference counting in a cache memory. During operation, the system receives a command to update an old cache line with a new cache line. The system then determines if the new cache line is different than the old cache line. If so, the system determines if the old cache line contains any in-cache references. If so, for each such in-cache reference, the system decrements a reference counter in a cache line containing an object which is referenced by the in-cache reference. The system also determines if the new cache line contains any in-cache references. If so, for each such in-cache reference, the system increments a reference counter in a cache line containing an object which is referenced by the in-cache reference. Note that the reference counter in a cache line indicates a count of references in the cache that refer to an object contained in the cache line.

In a variation on this embodiment, the system performs a garbage-collection operation on an object in a selected cache line when a reference counter in the selected cache line reaches zero. During the garbage-collection operation, the system determines if the object in the selected cache line is referenced by any registers. If not, the system collects the selected object.

In a further variation, performing a garbage-collection operation on an object in the selected cache line further involves invalidating the selected cache line. The system invalidates the selected cache line by determining if the selected cache line contains an in-cache reference. If so, for each such in-cache reference, the system decrements a reference counter in a cache line containing an object which is referenced by the in-cache reference. Finally, the system marks the selected cache line as invalid.

In a variation on this embodiment, the cache is an L2 cache.

In a further variation, the system forces write-backs of L1 cache lines to the L2 cache to ensure that the reference counters in the L2 cache lines are correct. The system then performs a garbage-collection operation on all objects in cache lines whose reference counters are zero.

In a variation on this embodiment, the reference counters are three-bit saturating counters.

In a variation on this embodiment, the reference counters are located with the tags of the cache lines.

In a variation on this embodiment, the system receives a command to evict a selected cache line. Upon receiving the command, the system determines if the selected cache line contains an in-cache reference. If so, for each such in-cache reference, the system saturates a reference counter in a cache line containing an object which is referenced by the in-cache reference. The system then evicts the selected cache line.

In a variation on this embodiment, the cache is a write-back cache.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1A:
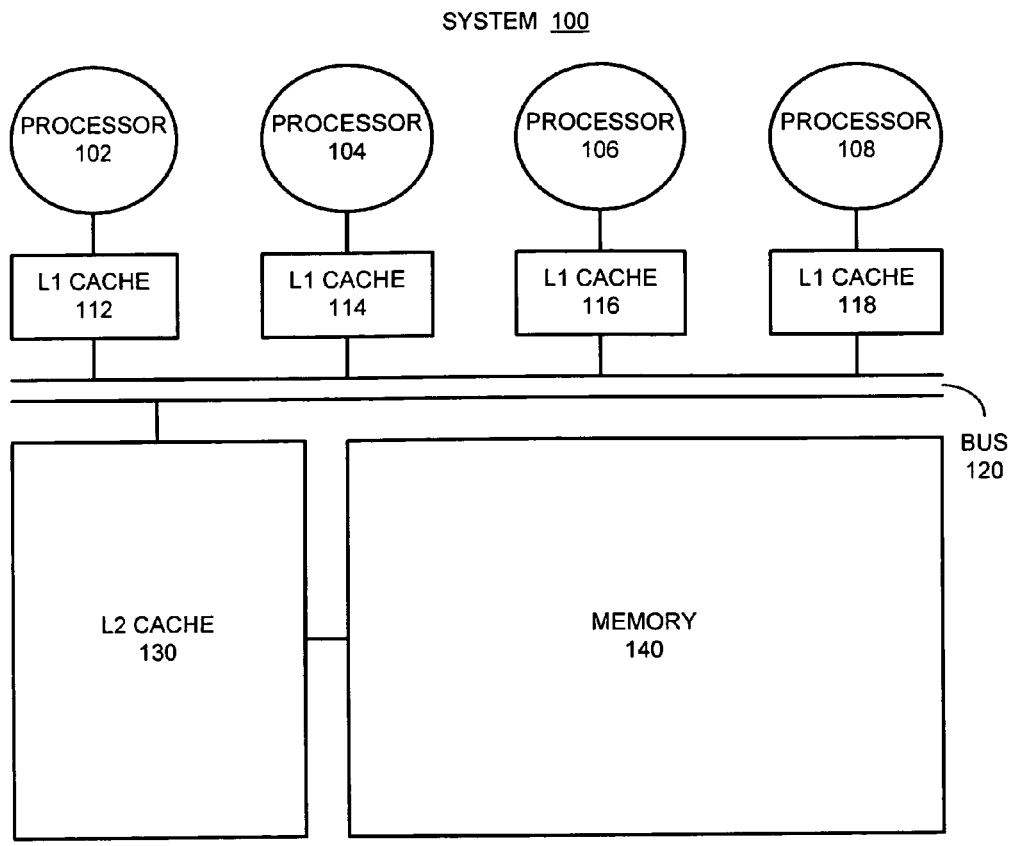
FIG. 1A illustrates a multiprocessor system in accordance with an embodiment of the present invention.

FIG. 1A illustrates a multiprocessor system 100 in accordance with an embodiment of the present invention. Multiprocessor system 100 includes processors 102-108 coupled to L1 caches 112-118 respectively. L1 caches 112-118 are coupled to bus 120. L2 cache 130 is also coupled to bus 120. Memory 140 is coupled to L2 cache 130. In the embodiment of the present invention illustrated in FIG. 1A, L2 cache 130 is shared between processors 102-106 and L1 caches 112-118 and L2 cache 130 are write-back caches. Also note that multiprocessor system 100 has an object-addressed memory hierarchy.

Cache Entries

Figure 1B:
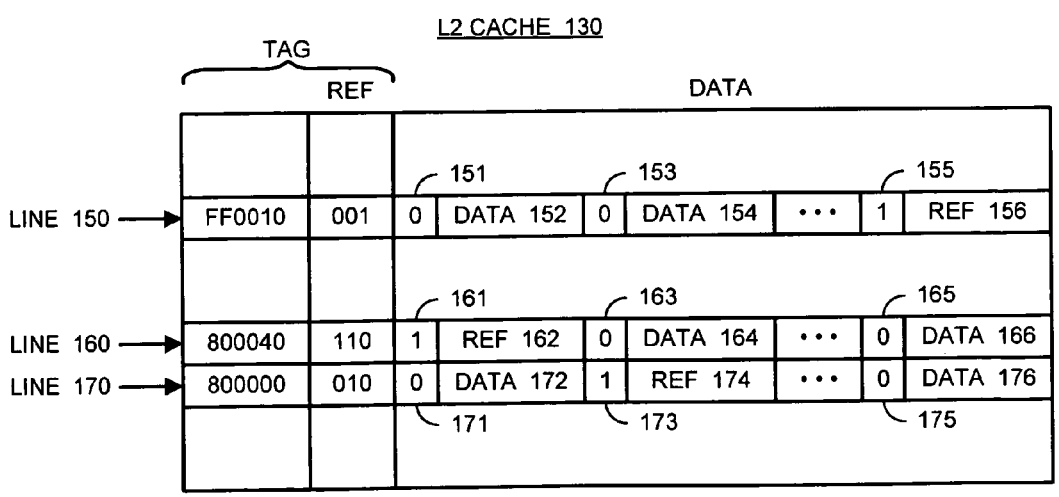
FIG. 1B illustrates a number of cache entries in accordance with an embodiment of the present invention.

FIG. 1B illustrates a number of cache lines 150, 160, and 170 in L2 cache 130 in accordance with an embodiment of the present invention. Each line in L2 cache 130, such as cache line 150, includes a tag portion and a data portion. The tag portion includes an object identifier (OID), an offset, and a reference counter. This reference counter keeps track of the number of references in L2 cache 130 that point to this particular cache line.

Note that to minimize the number of bits dedicated to the reference counter, in one embodiment of the present invention the reference counter is a three-bit saturating counter. In this embodiment, when the reference counter reaches a count of seven, the reference counter is saturated and further incrementing or decrementing of the reference counter is not allowed. Objects in L2 cache 130 that have saturated their reference counter can typically be expected to persist in L2 cache 130. Note that since the reference counters are used to keep track of when objects no longer have any other references pointing to them to facilitate garbage-collection, it is acceptable to saturate the reference counters at a count of seven, since the corresponding objects are unlikely to be collected in a subsequent garbage-collection operation.

As is illustrated in FIG. 1B, data words within cache lines 150, 160, and 170 include either references or data and are associated with "modified-reference" bits, which indicate whether the data words are references which have been modified since the cache line was brought into L2 cache 130 from memory 140. For example, modified-reference bits 155, 161, and 173 being set indicates that the corresponding data words contain modified-references 156, 162, and 174, respectively. In contrast, modified-reference bits 151, 153, 163, 165, 171, and 175 being unset indicates that corresponding data words contain data items (or references which have not been modified) 152, 154, 164, 166, 172, and 176, respectively. These modified-reference bits are used by the in-cache reference counting process as described below. It is sufficient to consider only modified references because an unmodified reference must previously have been evicted from the cache as described below.

Maintaining in-Cache Reference Counts

Figure 2:
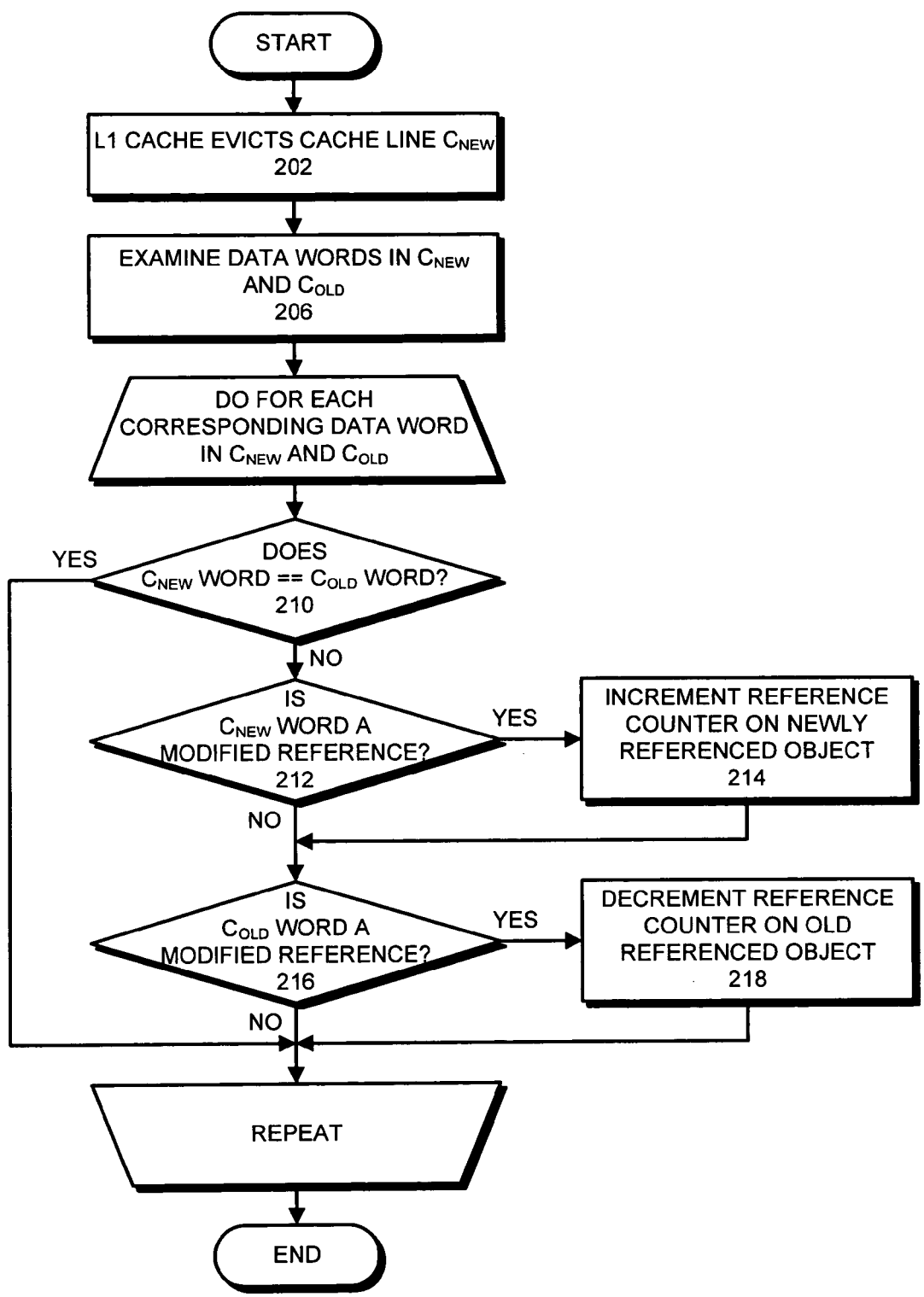
FIG. 2 presents a flowchart illustrating the process of maintaining an in-cache reference count in accordance with an embodiment of the present invention.

FIG. 2 presents a flowchart illustrating the process of maintaining an in-cache reference count in accordance with an embodiment of the present invention. For example, suppose L1 cache 112 evicts a cache line $C_{NEW}$ (step 202) and attempts a write-back of $C_{NEW}$ to L2 cache 130. In this case, the system examines the data words in $C_{NEW}$ and $C_{OLD}$ (the cache line being overwritten by $C_{NEW}$) in L2 cache 130 (step 206).

The system determines if the first word in $C_{NEW}$ is equal to the first word in $C_{OLD}$ (step 210), and if so, the system moves on to the second word in $C_{NEW}$ and $C_{OLD}$. However, if they are different, the system determines if the data word in $C_{NEW}$ is a modified-reference by checking the modified-reference bit as described in FIG. 1B (step 212). As described previously, the modified-reference bit is set for all data words that have had a reference stored into them since the cache line was brought into L2 cache 130. If the system determines that the data word in $C_{NEW}$ is a modified-reference, the system increments a reference counter in the newly referenced object (step 214). Additionally, the system determines if the data word in $C_{OLD}$ is a modified-reference by checking the modified-reference bit (step 216). If the system determines that the data word in $C_{OLD}$ is a modified-reference, the system decrements a reference counter in $C_{OLD}$ (step 218). The system repeats steps 210-218 for each corresponding data word in $C_{NEW}$ and $C_{OLD}$.

Evicting Cache Lines

Figure 3:
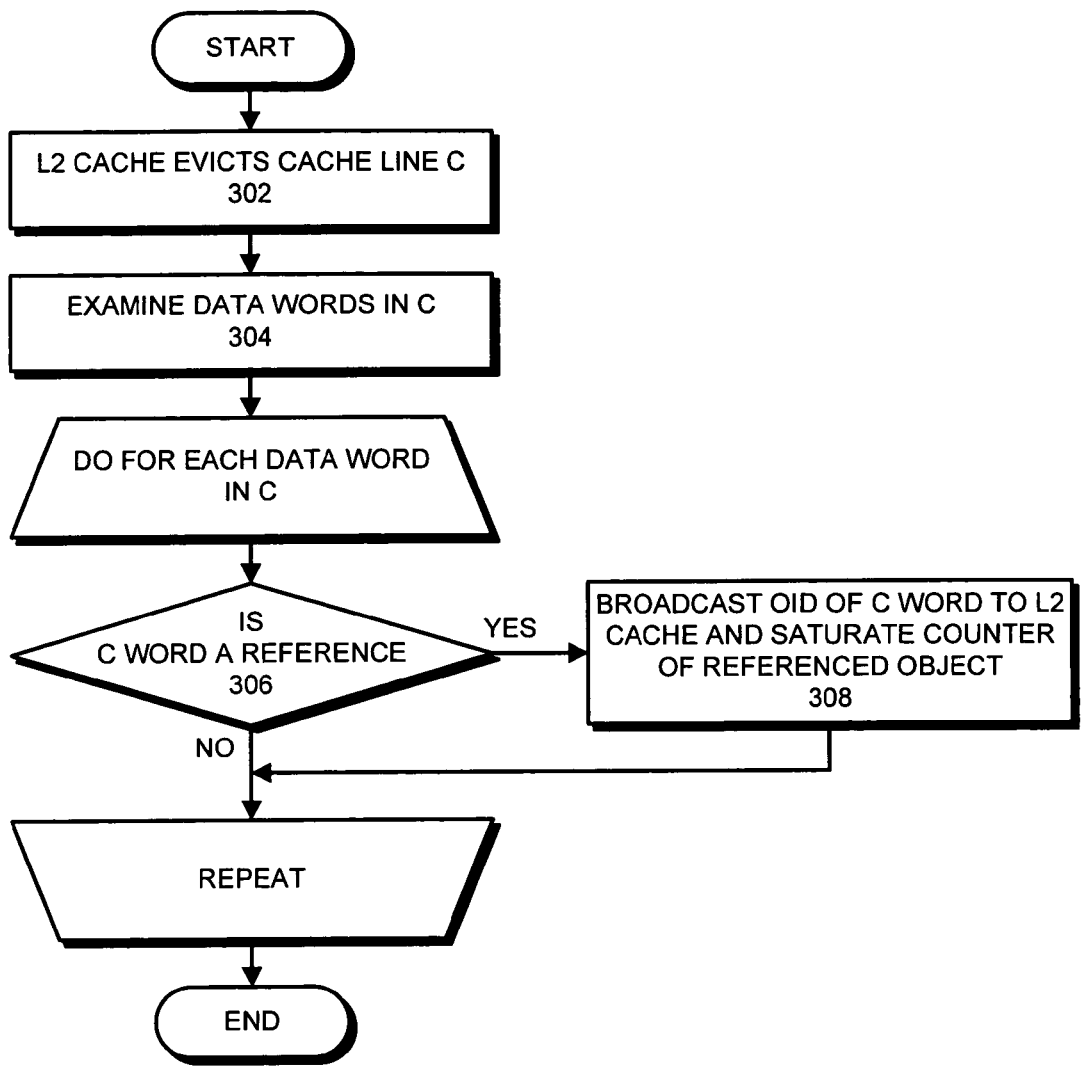
FIG. 3 presents a flowchart illustrating the process of evicting a cache line in accordance with an embodiment of the present invention.

FIG. 3 presents a flowchart illustrating the process of evicting a cache line from L2 cache 130 in accordance with an embodiment of the present invention. Upon evicting cache line C from L2 cache 130 (step 302), the system examines the words in C (step 304). The system determines if a data word in C is a modified-reference by checking the modified-reference bit (step 306). If so, the system broadcasts the OID of the word in C to L2 cache 130 and saturates the counter of the referenced object (step 308). This ensures that the referenced object's reference counter will never reach zero, which is important for subsequent in-cache garbage-collection operations since one of the references has escaped L2 cache 130. Note that steps 306 and 308 are repeated for each word in C.

In an alternate embodiment of the present invention, when cache line C is evicted from L2 cache 130, the system continues to operate as normal without the process described in FIG. 3. In this embodiment, there is no need to saturate the reference counters for objects referenced by cache lines that have been evicted. Since these references no longer reside in L2 cache 130, the corresponding in-cache reference counters can no longer be decremented to zero, and thus would never cause collection by an in-cache garbage-collection operation.

Performing in-Cache Garbage-Collection

Figure 4:
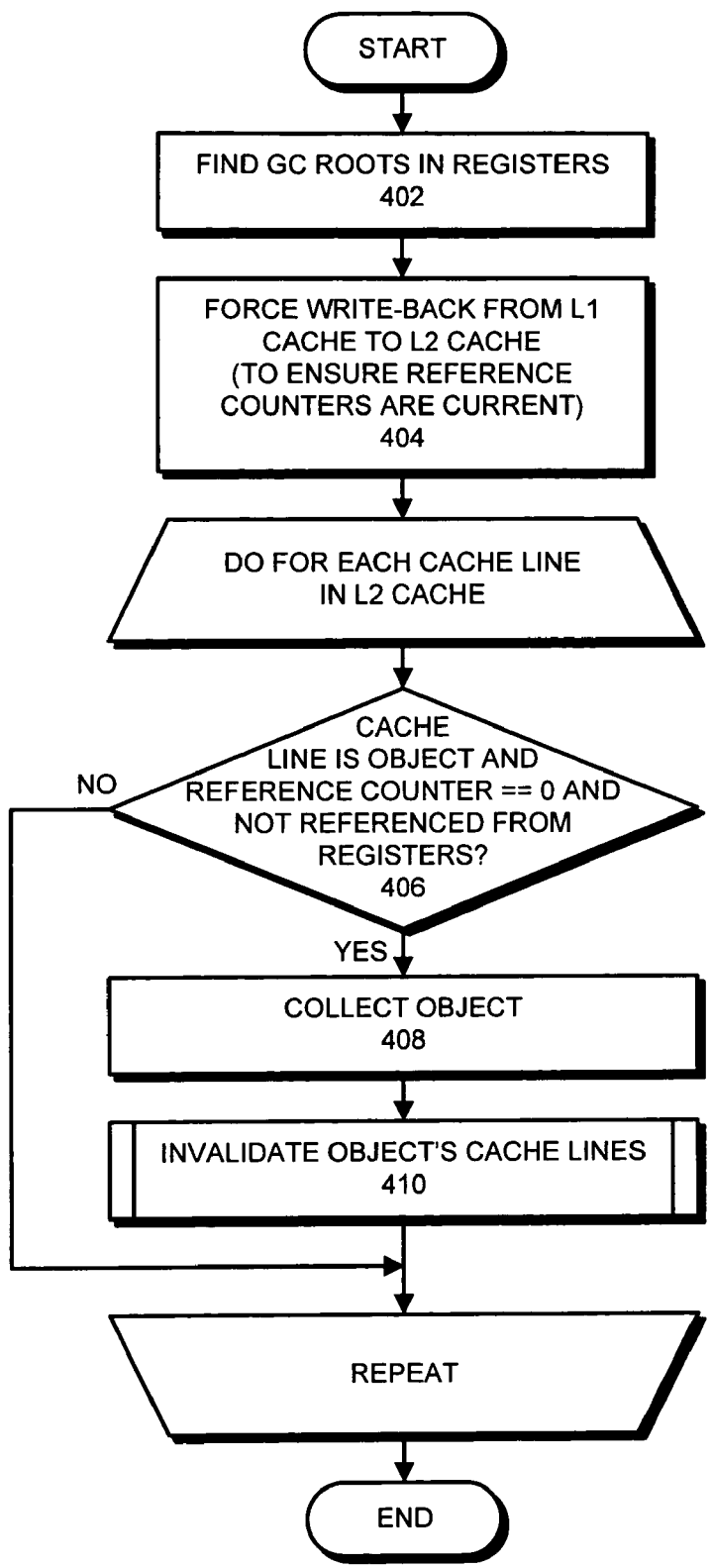
FIG. 4 presents a flowchart illustrating the process of performing an in-cache garbage-collection operation in accordance with an embodiment of the present invention.

FIG. 4 presents a flowchart illustrating the process of performing an in-cache garbage-collection operation in accordance with an embodiment of the present invention. The system operates by finding possible garbage-collection roots in the registers (step 402). The system also forces a write-back from the L1 caches to L2 cache 130 to ensure that the reference counters in L2 cache 130 are current (step 404). Note that the system could possibly scan through L1 cache and keep track of modified-references in L1 cache as well. Alternatively, if the L1 caches are write-through caches, the reference counters in L2 cache 130 are always current. The system determines if the cache line contains an object and the reference counter is zero, and that the object is not referenced from the registers (step 406). If so, the system collects the object immediately (step 408) and invalidates the object's cache lines (step 410) using a process which is described in more detail in FIG. 5. The system repeats steps 406-408 for each cache line in L2 cache 130.

At any time, if the system determines that the reference counter for an object reaches zero, the reference counter is current, and the object is not referenced from registers, the object can be collected immediately. This eliminates the delay caused by mark and sweep operations and allows for cache space to be collected immediately as it becomes available.

Invalidating an Object's Cache Lines

Figure 5:
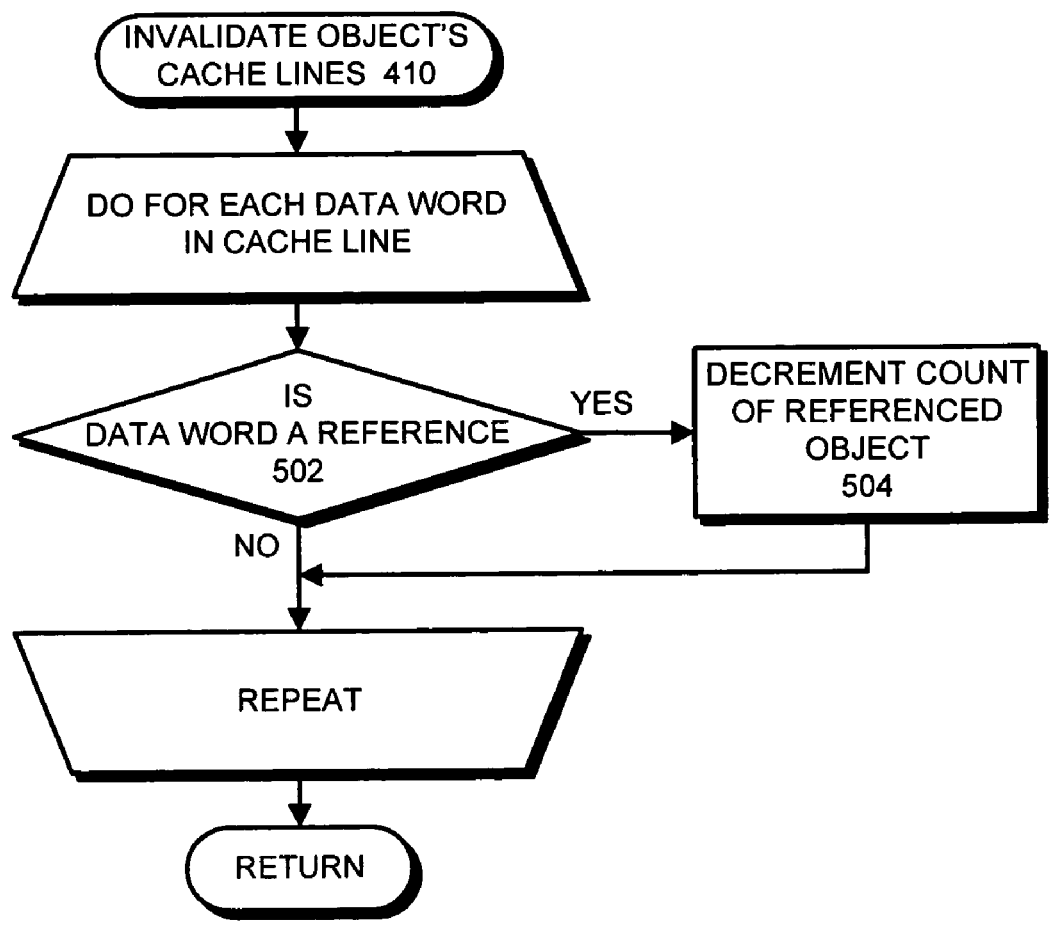
FIG. 5 presents a flowchart illustrating the process of invalidating an object's cache lines in accordance with an embodiment of the present invention.

FIG. 5 presents a flowchart illustrating the process of invalidating an object's cache lines in accordance with an embodiment of the present invention. When L2 cache 130 receives a command to invalidate an object's cache lines, the system determines if a data word in the cache lines is a reference (step 502). If so, the system decrements the count of the referenced object (step 504). The system repeats steps 502 and 504 for each data word in the cache lines being invalidated.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing in-cache reference counting in a cache memory, comprising:
   receiving a request to replace an old cache line that comprises a first set of words with a new cache line that comprises a second set of words, wherein each word in the first set of words and the second set of words includes data or a reference to an object in the cache memory, wherein at least one of the first set of words or the second set of words includes at least one reference to an object in the cache memory, and wherein the new cache line is received from another cache memory;
   for each word in the second set of words in the new cache line,
      determining if a word in the new cache line is different than a corresponding word in the old cache line;
      if so,
         determining if the corresponding word in the old cache line is a reference that refers to a first object within the cache memory and has been modified since the old cache line was brought into the cache memory, and if so, decrementing a reference counter for a cache line containing the first object, and
         determining if the word in the new cache line is a reference that refers to a second object within the cache memory and has been modified since the new cache line was brought into the other cache memory, and if so, incrementing a reference counter for a cache line containing the second object; and
      wherein the reference counter in a cache line keeps track of a total number of references in the cache that refer to objects in the cache line.

2. The method of claim 1, further comprising performing a garbage-collection operation on an object in a selected cache line when a reference counter in the selected cache line reaches zero, by:
   determining if the object in the selected cache line is referenced by any registers; and
   if not, collecting the object.

3. The method of claim 2, wherein performing a garbage-collection operation on the selected cache line further comprises invalidating the selected cache line by:
   determining if the selected cache line contains any in-cache references, and if so, for each such in-cache reference, decrementing a reference counter in a cache line which contains an object which is referenced by the in-cache reference; and
   marking the selected cache line as invalid.

4. The method of claim 1, wherein the cache is an L2 Cache.

5. The method of claim 4, further comprising:
   forcing write-backs of L1 cache lines to the L2 cache to ensure that the reference counters in the L2 cache lines are correct; and
   performing a garbage-collection operation on all cache lines whose reference counters are zero.

6. The method of claim 1, wherein the reference counters are three-bit saturating counters.

7. The method of claim 1, wherein the reference counters are located with the tags of the cache lines.

8. The method of claim 1, further comprising:
   receiving a command to evict a selected cache line;
   determining if the selected cache line contains any in-cache references, and if so, for each such in-cache reference, saturating a reference counter in a cache line which is pointed to by the in-cache reference; and
   evicting the selected cache line.

9. The method of claim 1, wherein the cache is a write-back cache.

10. An apparatus for performing in-cache reference counting in a cache, comprising:
   a receiving mechanism configured to receive a request to replace an old cache line that comprises a first set of words with a new cache line that comprises a second set of words, wherein each word in the first set of words and the second set of words includes data or a reference to an object in the cache memory, wherein at least one of the first set of words or the second set of words includes at least one reference to an object in the cache memory, and wherein the new cache line is received from another cache memory;
   a determination mechanism configured to determine, for each word in the second set of words in the new cache line, if a word in the new cache line is different than a corresponding word in the old cache line;
   a determination mechanism configured to determine if the corresponding word in the old cache line is a reference that refers to a first object within the cache memory and has been modified since the old cache line was brought into the cache memory and if the word in the new cache line is a reference that refers to a second object within the cache memory and has been modified since the new cache line was brought into the cache memory;
   a decrementing mechanism configured to decrement a reference counter in a cache line which contains the first object, only if the word in the new cache line is different than the corresponding word in the old cache line and the corresponding word in the old cache line is the reference that has been modified since the old cache line was brought into the cache memory;
   a incrementing mechanism configured to increment a reference counter in a cache line which contains the second object, only if the word in the new cache line is different than the corresponding word in the old cache line and the word in the new cache line is the reference that has been modified since the new cache line was brought into the other cache memory; and
   wherein the reference counter in a cache line keeps track of a total number of references in the cache that refer to objects in the cache line.

11. The apparatus of claim 10, further comprising a garbage-collection mechanism configured to perform a garbage-collection operation on an object in a selected cache line when a reference counter in the selected cache line reaches zero, wherein the garbage-collection mechanism further comprises:
   a register determination mechanism configured to determine if the object in the selected cache line is referenced from registers; and
   wherein the garbage-collection mechanism is further configured to collect the object in the selected cache line if the object is not referenced by any registers.

12. The apparatus of claim 11, wherein the garbage-collection mechanism is further configured to invalidate the selected cache line by:
   determining if the selected cache line contains any in-cache references, and if so, for each such in-cache reference, decrementing a reference counter in a cache line which contains an object which is referenced by the in-cache reference; and
   marking the selected cache line as invalid.

13. The apparatus of claim 10, wherein the cache is L2 Cache.

14. The apparatus of claim 13, further comprising:
a write-back mechanism configured to force write-backs of L1 cache lines to the L2 cache to ensure that the reference counters in the L2 cache lines are correct; and
wherein the garbage-collection mechanism is additionally configured to perform a garbage-collection operation on all cache lines whose reference counters are zero.

15. The apparatus of claim 10, wherein the reference counters are three-bit saturating counters.

16. The apparatus of claim 10, wherein the reference counters are located with the tags of the cache lines.

17. The apparatus of claim 10, further comprising:
a saturating mechanism configured to saturate reference counters in cache lines pointed to by in-cache references in a selected cache line;
an eviction mechanism configured to evict the selected cache line; and
wherein the saturating mechanism and the eviction mechanism are further configured to operate upon receiving a command to evict the selected cache line.

18. The apparatus of claim 10, wherein the cache is a write-back cache.

19. A computer system that performs in-cache reference counting, comprising:
a processor;
a cache;
a receiving mechanism configured to receive a request to replace an old cache line that comprises a first set of words with a new cache line that comprises a second set of words, wherein each word in the first set of words and the second set of words includes data or a reference to an object in the cache memory, wherein at least one of the first set of words or the second set of words includes at least one reference to an object in the cache memory, and wherein the new cache line is received from another cache memory;
a determination mechanism configured to determine, for each word in the second set of words in the new cache line, if a corresponding word in the new cache line is different than the word in the old cache line;
a determination mechanism configured to determine if the corresponding word in the old cache line is a reference that refers to a first object within the cache memory and has been modified since the old cache line was brought into the cache memory and if the word in the new cache line is a reference that refers to a second object within the cache memory and has been modified since the new cache line was brought into the cache memory;
a decrementing mechanism configured to decrement a reference counter in a cache line which contains the first object, only if the word in the new cache line is different than the corresponding word in the old cache line and the word in the old cache line is the reference that has been modified since the old cache line was brought into the cache memory;
a incrementing mechanism configured to increment a reference counter in a cache lines which contains the second object, only if the word in the new cache line is different than the corresponding word in the old cache line and the word in the new cache line is the reference that has been modified since the new cache line was brought into the other cache memory; and
wherein the reference counter in a cache line keeps track of a total number of references in the cache that refer to objects in the cache line.

20. The computer system of claim 19, further comprising a garbage-collection mechanism configured to perform a garbage-collection operation on an object in a selected cache line when a reference counter in the selected cache line reaches zero, wherein the garbage-collection mechanism further comprises:
a register determination mechanism configured to determine if the object in the selected cache line is referenced from registers; and
wherein the garbage-collection mechanism is further configured to collect the object if the object is not referenced by any registers.

* * * * *